Aug. 14, 1928.  1,680,720
F. L. ARMITAGE
APPARATUS FOR PASTEURIZING AND DEODORIZING CREAM
Filed July 17, 1925
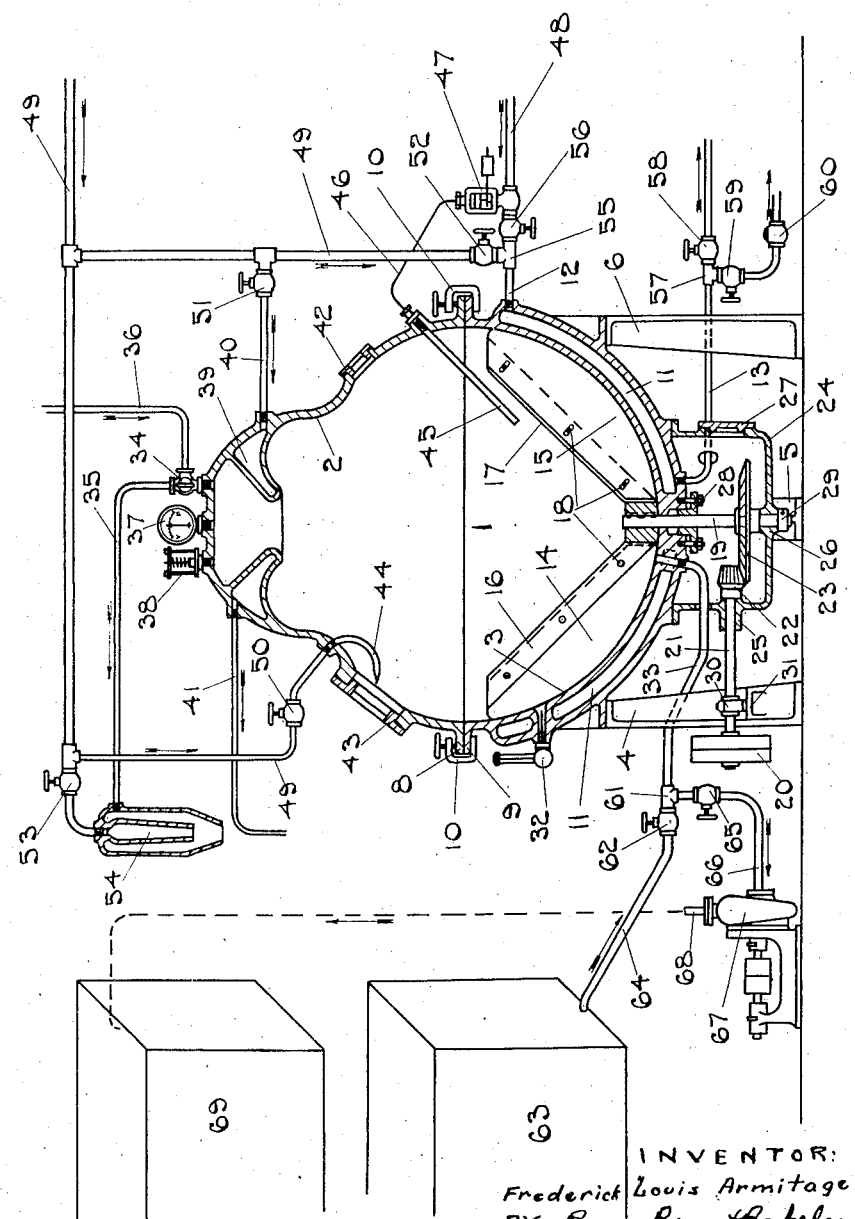
INVENTOR:
Frederick Louis Armitage
BY: Ruger, Bayne & Bakelar
ATTORNEYS.

Patented Aug. 14, 1928.

1,680,720

UNITED STATES PATENT OFFICE.

FREDERICK LOUIS ARMITAGE, OF DEVONPORT, NEAR AUCKLAND, NEW ZEALAND.

APPARATUS FOR PASTEURIZING AND DEODORIZING CREAM.

Application filed July 17, 1925, Serial No. 44,210, and in New Zealand August 2, 1924.

This invention relates to methods of treating cream for butter making and milk for cheese making. The object of my invention is to produce an improved cream from raw cream Pasteurized deodorized and also if desired cooled for butter making and a similar improved milk for cheese making. This object is effected by the method or process and the apparatus hereinafter described. A leading feature of my invention is the simultaneous Pasteurizing and deodorizing of the raw cream or milk in one container and if desired the complete or partial cooling thereof in the same container thus carrying out three operations on the liquid whilst it remains in one container. Further features of my invention are, (a) boiling the liquid in a container in a partial vacuum, (b) the prevention of scorching of the liquid by automatic agitation thereof without using mechanical means, (c) providing for automatically controlled even heating of the whole of the liquid for a desired time and at the same time preventing overheating, (d) preventing the deposit of material from the liquid on the inside surface of the container, (e) circulating brine for wholly cooling and water for the partial cooling of the liquid and by also maintaining by a reduced pressure within the container a condition of ebullition so that the cooling is effected with great rapidity, and (f) preventing the boiling or frothing up of the liquid to an injurious extent to the top of the container.

The methods of Pasteurization of milk used hitherto and the apparatus for carrying them out have been specially devised for the Pasteurization of milk for milk supplies. This has involved certain limitations necessitated by the sensitiveness of milk to heat above certain temperatures and beyond certain periods of time. To obviate the danger of imparting a cooked taste to the milk and of interfering with the cream line or of causing injurious chemical changes, the Pasteurization of milk is generally prohibited from being carried out above a temperature of 150° F., and Pasteurized milk is generally defined as milk which has been retained at a temperature of not less than 145° F. and not more than 150° F. for at least thirty minutes, and immediately cooled to a temperature of not more than 50° F., and protected from recontamination.

In the Pasteurization of cream for butter making, however, this prohibition does not apply and different conditions prevail as the product is less affected by heat, and unless a temperature as high as 165° F. is used the stability of the butter suffers, while the flavour is not affected unless the temperature is over 175° F. In practice, however, temperatures much above these have been used, even as high as 210° F., in a desperate but vain attempt to get rid of the objectionable odors and taints that cream so often possesses particularly in the summer. The higher temperatures for Pasteurization of cream are necessitated by the much greater bacterial contamination due to various factors such as the lack of care in cleanliness in the cows, the utensils, the machines and the methods used, also when home separation is carried out, to the age of the cream by the time it reaches the factory.

Flash and continuous processes have similar drawbacks in the Pasteurization of cream to those they have in the Pasteurization of milk, and the only process that can be relied on to bring about efficient and satisfactory Pasteurization of cream for butter making is a holding process in which the temperature used, the period of heating and the certainty of the even heating of every portion of the cream as regards temperature and time are under the control and at the discretion of the operator.

These conditions are fulfilled by my invention. The nature of the milk and cream supplied to factories for butter making, however, necessitates other treatment than Pasteurization in order to get the best results in quality of butter. Deodorization is necessary to remove all objectional volatile odors and taints from the raw cream. Shortly the treatment of raw cream so as to make it into or produce therefrom an article better than hitherto known for butter making is as follows according to my invention.

Pasteurization and deodorization of the raw cream are carried out simultaneously in the same container and partial or complete cooling of the Pasteurized and deodorized cream can also be effected in the same container. Thus three steps in the treatment are effected in the same container.

The Pasteurization and deodorization are effected by boiling the cream at the reduced temperatures rendered possible by the combined use of a steam jacket on the container and a partial vacuum operating on the inside of the container. The boiling of the cream is started at a comparatively low temperature by the combined effect of the steam jacket and a vacuum pump, and the boiling is continued as the temperature is allowed to rise by manipulation of the degree of vacuum, until the desired Pasteurization temperature is reached. Any temperature up to 212° F. can be obtained, but it has not been found necessary to exceed 175° F. The temperature is presented from rising above the desired degree by means of a thermostat acting in the well known way. The condition of boiling is maintained by regulation of the vacuum to that pressure which will enable the cream to boil at the Pasteurizing temperature used. The movement of the cream caused by the boiling renders unnecessary any mechanical means of agitation. Deposition of material from the liquid on the inside of the vessel and resultant insulation thereof is prevented by scraping off the deposit as formed.

The Pasteurization being completed to the requirements of the operator as regards temperature and time, the steam is cut off, cold water circulated through the jacket and the vacuum pump kept working, and the scrapers kept moving. While the temperature is dropping the cream is kept boiling by means of increasing the vacuum. The temperature rapidly falls to a point determined by the temperature of the water used, and the time allotted. The vacuum is then broken and the cream pumped to a separate cooler located outside the container. If the conveniences of the factory enable cold brine to be used instead of cold water, the cooling can be completed in the container and the subsequent use of a separate cooler eliminated. The Pasteurizer is then ready to treat another batch of cream.

The apparatus is so designed that the filling, treating and discharging can be completed in about 35 minutes if a separate cooler is used, the rate of treatment being about 500 gallons per hour with a machine of a capacity for treating 300 gallons at a time. If cooling be completed within the container instead of using a separate cooler the rate of treatment is only about 400 gallons per hour, but economy is effected in time and labour by elimination of the separate cooler.

The efficiency of the Pasteurizing is undoubted as it can be carried out at any temperature from 145° to 212° for any length of time desired.

The deodorization or removal of objectionable volatile odors and flavours is thoroughly and completely carried out by the effect of boiling in a partial vacuum and the said odors are removed altogether from the cream and also from the container by the vacuum.

My process produces a cream so improved that first-grade butter can be made from it whereas butter made from a cream not so improved or improved by other methods would be classed as second-grade. It enables the farmer to feed turnips to his cows without any fear of the butter produced from his cream being classed as second-grade because of a turnip smell or taste.

On the other hand clean sweet cream that has no objectionable taint can be Pasteurized without the removal of any of the good and desirable odors and flavours natural to a high grade butter, by reducing or dispensing with the vacuum.

Referring to the accompanying drawings illustrating a preferred embodiment of the apparatus according to my invention, the container 1 consists of a top section 2 attached directly above a hemispherical bottom section 3 mounted on four legs such as 4, 5, 6 (one not shown). The lower portion of the top section 2 is formed with a flange 8, which is attached to a corresponding flange 9 on the bottom section 3, by clamps 10.

Round the lower section 3 is formed a jacket 11 to which is connected an inlet pipe 12 and outlet pipe 13. Inside the container 1 in contact with the bottom section 3 there are two scrapers 14 and 15 carried by spiders 16 and 17 provided with slotted holes and bolts 18 for wear adjustment.

These spiders 16 and 17 are revolved by a shaft 19 driven by the pulley 20, shaft 21, bevel pinion 22, and bevel wheel 23. The bevel pinion 22 and wheel 23 are enclosed in a housing 24 (attached to the base of the bottom section 3) which has two bosses 25 and 26 acting as bearings for the shafts 19 and 21. An inspection door 27 allows access to bevel pinion 22, wheel 23 and gland 28. Lifting of the spiders 16 and 17 is prevented by a collar 29 on the bottom of shaft 19. The outer end of shaft 21 is mounted in a bearing 30 supported by a bracket projection 31 of the leg 4. Attached to the outside of the bottom section 3 there is a thermometer 32 arranged so that it registers the temperature of the liquid inside the container 1. A pipe 33 passes through jacket 11 for the admission or removal of liquid in container 1. Fitted to the top of top section 2 on the outside is a three way cock 34 with a vacuum pipe 35 connected to one branch and an air admission pipe 36 connected to the other.

A vacuum and pressure gauge 37 and low pressure safety valve 38 are also fitted to the top of top section 2. Near the top, inside of the top section 2, there is formed an annular tank 39 for froth repelling to which is connected an inlet pipe 40 and outlet pipe 41. To the sides of top section 2 is fitted a glass inspection cover 42, a combined manhole and inspection port 43 with glass cleaning spray pipe 44. A thermostat expansion tube 45 in the inside of the container 1 is connected by a pipe 46 outside of the container 1 to a thermostatic valve 47 on the steam pipe 48. A water main 49 supplies valves 50, 51, 52 and 53 the latter admitting water to the hydro jet vacuum pump 54.

A T 55 connects water valve 52 and steam valve 56 to the jacket 11 inlet pipe 12. A T 57 connects water outlet valve 58 and steam outlet valve 59 (with steam trap 60) to the outlet pipe 13 of the jacket 11. A T 61 connects pipe 33 to supply valve 62 leading from the supply vat 63 via pipe 64. The T 61 also connects pipe 33 to the delivery valve 65 and pipe 66 to pump 67 and from thence through pipe 68 to receiving vat 69.

The apparatus is operated as follows starting off with all valves and connections closed.

Supply valve 62 is turned on, the liquid flows by gravity from supply vat 63 through pipes 64 and 33 into container 1. To increase the speed of flow of liquid into the container 1 from supply vat 63 a vacuum can be created in the container 1 by opening valve 53 which starts hydro jet vacuum pump 54, and turning three way cock 34 so that the container 1 is open to vacuum pipe 35. When the desired quantity of liquid has been admitted to the container 1 as determined by inspection through manhole and inspection port 43 the supply valve 62 is shut off, three way cock 34 turned so that container 1 is open to the atmospheric pipe 36 the vacuum thus being broken and the hydro jet vacuum pump 54 stopped by closing valve 53.

The scrapers 14 and 15 are then revolved by setting in motion pulley 20, steam supply valve 56 and steam outlet valve 59 are then opened. This allows steam to enter the jacket 11 and condensed steam to pass out of the jacket 11 through pipe 13 and steam trap 60.

The thermostatic valve 47 is now adjusted so that the temperature of the liquid in the container 1 will not be raised above a predetermined temperature, this being controlled by the expansion tube 45 which is in contact with the liquid in the container 1.

The valve 51 is turned on allowing water to enter the froth repelling tank 39 through the pipe 40, the overflow escaping through pipe 41.

When the liquid in the container 1 reaches the temperature desired indicated by thermometer 32, to deodorize the liquid, vacuum is created in container 1 by opening valve 53 which starts the hydro jet vacuum pump 54 and opening container 1 to vacuum pipe 35 by turning three way cock 34.

At certain periods of the year, cows are fed on turnips, which give the milk a turnipy flavor, but at other periods there is no turnipy flavor. At times when the turnipy flavor is strong it is necessary to have the vacuum in the container 1 for a longer time than when not strong and it may not be necessary to deodorize at all at times.

The vacuum in container 1 acting on the hot liquid causes ebullition, the froth rises but it is prevented from entering the vacuum pipe 35 by coming in contact with cold surface of the froth repelling tank 39 cold surfaces having a repelling action on froth.

The liquid is kept at the desired temperature for the desired period, the slow rotation of the scrapers 14 and 15 preventing insulation by deposit from the liquid of the surface of the bottom section 3 exposed to the heat of the jacket 11, the contents occasionally being examined through inspection port and manhole 43 the glass of which is cleaned by a water spray 44 worked by turning on valve 50.

The liquid having been boiled for the desired period, to cool it down close steam inlet valve 56 and outlet valve 59 and open water inlet valve 52 and outlet valve 58. This allows cold water to circulate through the jacket 11 bringing the temperature of the liquid in container 1 down rapidly with continued assistance of the vacuum. Instead of circulating cold water as above described, through jacket 11, the cooling can be done more speedily by circulating cold brine when available.

To remove the liquid in the container 1, break vacuum by turning three way cock 34 so that the container 1 is open to the air admission pipe 36. Shut off hydro jet vacuum pump 54 by closing valve 53, close valve 51 which stops the water circulating in the froth repelling jacket 39, close valves 52 and 58 which stops circulation of cold water in the jacket 11, stop rotation of the scrapers 14 and 15 open delivery valve 65, start up delivery pump 67 and it will pump the liquid in container 1 through pipes 33, 66 and 68 into the receiving vat 69, air entering the pan 1 to take the place of the removed liquid by the air admission pipe 36.

If however it is desired to immediately put through another batch of liquid, it is not necessary to stop the rotation of the scrapers or shut valves 53 and 51 because immediately the first batch is removed, valve 65 is closed, valve 62 opened, three way cock 34 opened to the vacuum and the steam turned on, a fresh batch being drawn into the container 1. The liquid may be cooled outside the container 1 by delivering it when hot over a suitably located separate cooler of any suitable known design before or after it enters receiving vat 69.

I claim:

In an apparatus for simultaneously Pasteurizing and deodorizing cream, a container having a top section and a bottom section detachably connected together, froth-repelling means carried within said top section at the top thereof, and scraping means rotatable within the bottom section and in contact with the wall thereof.

In testimony whereof he affixes his signature.

FREDERICK LOUIS ARMITAGE.